United States Patent

Hirashima

[15] 3,692,929

[45] Sept. 19, 1972

[54] COLOR TELEVISION RECEIVER WITH COLOR SIGNAL CORRECTION FOR VARIOUS TRANSMISSION CHANNELS

[72] Inventor: Masayoshi Hirashima, Takatsuki, Japan

[73] Assignee: Mansushita Electric Industrial Co., Ltd., Osaka, Japan

[22] Filed: Dec. 10, 1970

[21] Appl. No.: 96,759

[30] Foreign Application Priority Data

| | | |
|---|---|---|
| Dec. 16, 1969 | Japan | 44/102198 |
| Dec. 16, 1969 | Japan | 44/102199 |
| Dec. 16, 1969 | Japan | 44/102201 |
| Dec. 23, 1969 | Japan | 45/581 |
| Dec. 29, 1969 | Japan | 45/757 |
| Feb. 3, 1970 | Japan | 45/9747 |

[52] U.S. Cl. ......178/5.4 R, 178/5.4 AC, 178/5.4 HE

[51] Int. Cl. ..............................................H04n 9/48

[58] Field of Search........178/5.4 R, 5.4 MC, 5.4 HE, 178/5.4 AC, 5.8 AF; 325/457

[56] References Cited

UNITED STATES PATENTS

| | | | |
|---|---|---|---|
| 3,573,355 | 4/1971 | Cavelos | 178/5.8 AF |
| 3,595,988 | 7/1971 | Kawamata et al. | 178/5.4 R |

*Primary Examiner*—Robert L. Griffin
*Assistant Examiner*—George G. Stellar
*Attorney*—Stevens, Davis, Miller & Mosher

[57] ABSTRACT

A color television receiver provided with a plurality of color signal regulator variable resistors having respective slide terminals connected to corresponding fixed contacts of a switch interlocked to the tuning mechanism of a receiver. The color signal regulators may be preset such that substantially the same color saturation or hue of the chrominance signal output may be obtained irrespective of the channel to which it is tuned in.

8 Claims, 11 Drawing Figures

M. HIRASHIMA
INVENTOR

BY Stevens, Davis, Miller & Mosher
ATTORNEYS

COLOR TELEVISION RECEIVER WITH COLOR SIGNAL CORRECTION FOR VARIOUS TRANSMISSION CHANNELS

This invention relates to color television receivers and, more particularly, to the color saturation control and hue control in color television receivers.

The fundamental or reference color saturation and hue, which constitute the chrominance intelligence of the transmitted chrominance signal, considerably vary within the broadcast standards with different broadcast stations. Such variation cannot be kept uniformly compensated for on the receiving side with the usual color television receiver.

Accordingly, it is an object of the invention to enable having common saturation and hue with respect to different broadcast channels by precompensating for variations in color saturation and hue among the individual stations.

Another object of the invention is to provide an excellent circuit for the color saturation control.

A further object of the invention is to provide an excellent circuit for the hue control.

These and other objects as well as the features and advantages of the invention will become more apparent from the following description, reference being made to the accompanying drawings, in which.

Figure 1:
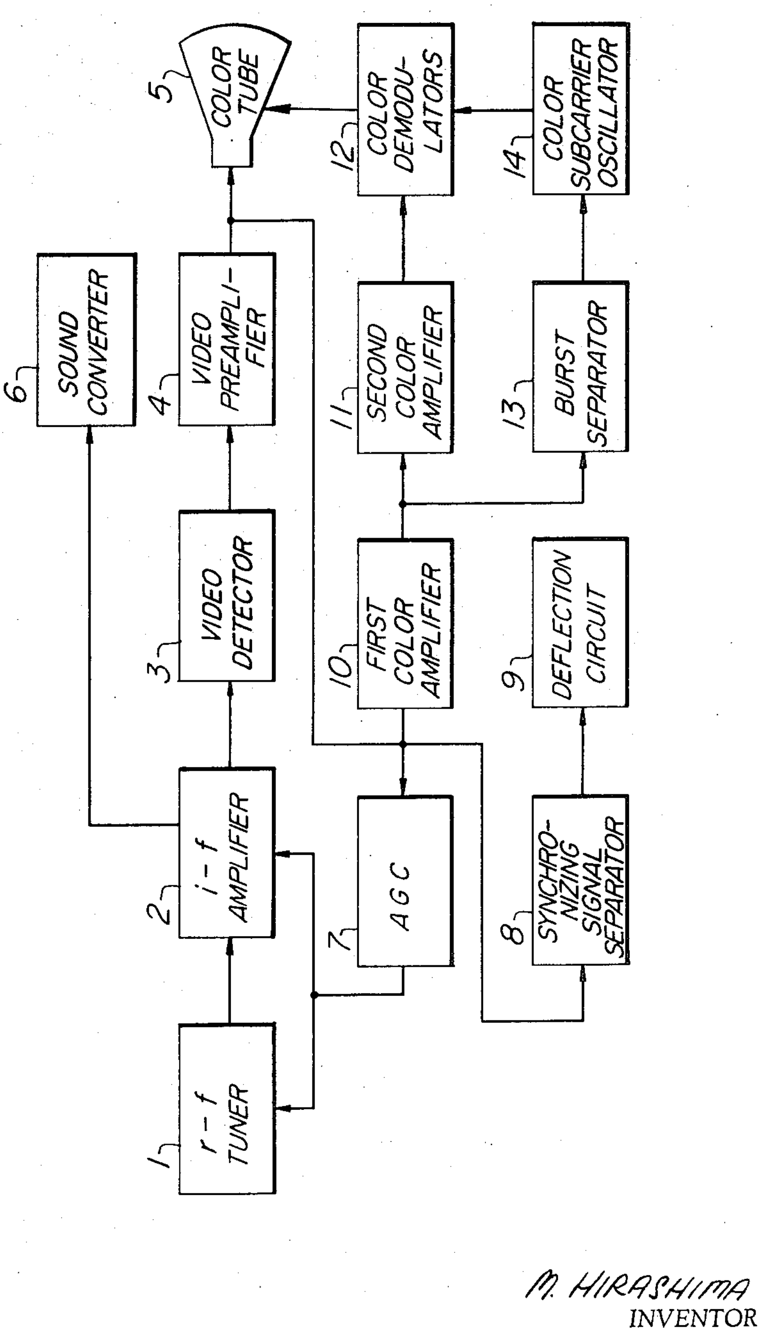
FIG. 1 depicts a block diagram of the main sections of a color television receiver, to which the invention pertains.

FIG. 1 shows the main sections of a color television receiver pertaining to the invention. In the figure, reference numeral 1 designates *r-f* tuner, numeral 2 *i-f* amplifier, numeral 3 video detector, numeral 4 video preamplifier, numeral 5 color tube, numeral 6 sound converter, numeral 7 AGC, numeral 8 synchronizing signal separator, numeral 9 deflection circuit, numerals 10 and 11 the respective first and second stages of the chrominance band-pass amplifier, numeral 12 color demodulators, numeral 13 burst separator, and numeral 14 color subcarrier oscillator synchronized to the burst output of the burst separator.

The embodiments of the invention will now be described in conjunction with the sections 10, 11 and 13 in the above circuitry.

Figure 2:
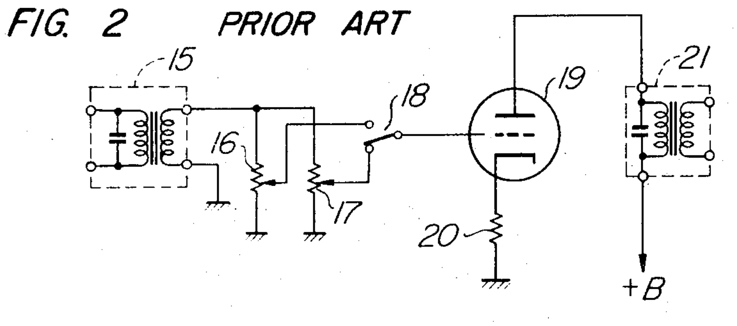
FIG. 2 PRIOR ART
FIG. 2 depicts a circuit diagram of part of the chrominance amplifier in the conventional color television receiver.

FIG. 2 shows the second stage 11 of the chrominance band-pass amplifier in the above circuitry. In the figure, numeral 15 designates a color take-off transformer tuned to the color subcarrier, numerals 16 and 17 color level controls, numeral 18 a changeover switch, numeral 19 a band-pass amplifier tube, numeral 20 a cathode resistor, and 21 a band-pass transformer tuned to the color subcarrier. Although the color killer voltage and blanking pulse are also impressed on the second chrominance band-pass amplifier stage, they are not described because they are impertinent to the description of the invention. The color saturation control 16 is a manual control, while the color saturation control 17 is an automatic or semi-fixed control with its variable resistance preset to a fixed value. They divide the output voltage of the color take-off transformer 15 to provide an appropriate color saturation of a picture on the receiver tube screen. Fine adjustments of the picture color saturation by the viewer may be made by manipulating the manual control 16, and an appropriately preset saturation may be obtained by switching the switch 18 to the "AUTO" side. However, the relation between the degree of chrominance signal modulation and the amplitude of the burst signal at the subcarrier frequency introduced at the transmitting station is not constant for different television stations. Therefore, when channels are switched one over to another the color saturation also changes, which is very inconvenient to the viewer. Also, there are many color television receivers without the automatic color saturation control 17. In some color television receivers, the manual color saturation control 16 is inserted to the output side of the tube 19 (behind the transformer 21). These arrangements are principally the same.

Figure 3:
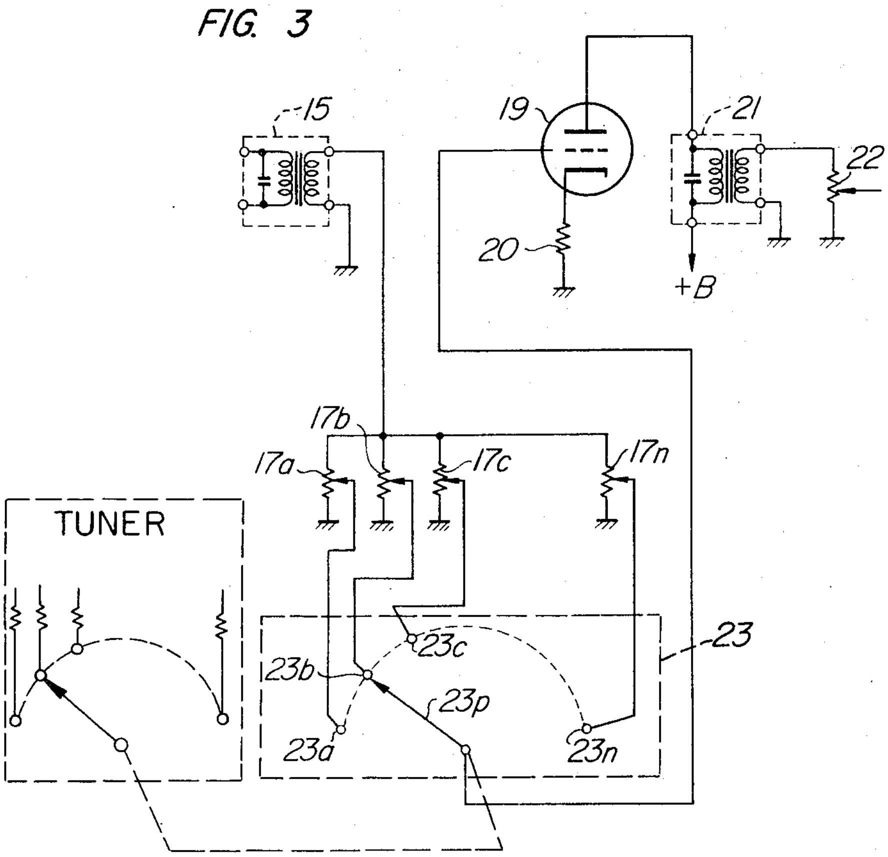
FIG. 3 depicts a circuit diagram showing an embodiment of the circuit in the color television receiver according to the invention.

FIG. 3 shows a simplest embodiment of the invention. In the figure, parts 15, 19, 20 and 21 are the same in function as the corresponding parts in the circuit of FIG. 2. In this embodiment, presettable variable resistors 17*a*, 17*b*, . . . 17*n* are provided in a number corresponding to the number of the channels selectable by the tuner and have respective taps leading to a switch 23, which is interlocked with the tuner mechanism. In the usual color television, the automatic color saturation control provides different color saturation levels for different television stations or channels, because it is related to the amplitude of the burst or the amplitude of color subcarrier synchronous to the burst, which does not change with the degree of modification of the main picture subcarrier but is proportional to the amplitude of the high frequency input signal or the amplitude of the subcarrier chrominance signal. With the *n* presettable variable resistors arranged as in this embodiment, the difference in the color level among the respective television channels may be kept eliminated by precompensating the channels for variations in the degree of chrominance signal modulation with respect to the burst introduced at the individual television stations.

The switch 23 is interlocked to the tuner of the television receiver such that if channel *b*, for instance, among channels *a*, *b*, . . . *n* is selected the switch pole 23*p* is thrown to fixed contact 23*b*. Any channel may be made a reference channel for precompensating for the color saturation deviation, so the color saturation control 17*b* is subsequently adjusted to a desired color saturation. The output of the color take-off transformer 15 is coupled through the semi-fixed resistor 17*b*, fixed contact 23*b* and switch pole 23*p* to the control grid of the band-pass amplifier tube 19, and the amplified output of the tube 19 is coupled to the band-pass transformer 21, which provides its chrominance signal output for demodulation by the color demodulators 12. By the suitable adjustment of the color saturation control 17*b*, the input signal to the tube 19 has a predetermined amplitude appropriate to provide the desired color saturation of the picture reproduced on the color tube.

By switching the tuner to the next channel *c*, the switch pole 23*p* of the switch 23, which is interlocked to the tuner mechanism, is thrown to the next contact 23*c*. Then, similar to the previous case the output of the color take-off transformer 15 is coupled through the semi-fixed resistor 17*c*, fixed contact 23*c* and switch pole 23*p* to the control grid of the band-pass amplifier tube 19. This time, the color saturation control 17*c* may be adjusted to set the color saturation for this channel to be equal to that for the reference channel *b*.

The same procedure may be repeated for the remaining channels *d* to *n* and *a*. With the color saturation controls 17*a* to 17*n* once pre-adjusted such that the same desired color saturation may be obtained for any of the corresponding channels, the different relationship between the chrominance signal modulation degree and the amplitude of the burst signal with different broadcast stations will not give rise to different color saturation levels as would otherwise be encountered when switching between channels. In other words, the appropriate presetting of the color saturation controls 17*a* to 17*n* makes up for variations of the chrominance signal modulation degree with respect to the burst to provide for a constant amplitude of the input signal to the control grid of the band-pass amplifier tube 19.

In the above manner, the variation in the color saturation among the individual channels may be eliminated through the color saturation controls 17*a* to 17*n*. However, if the viewer desires more or less color, the color saturation may be readjusted uniformly for all the channels by merely manipulating a manual color saturation control consisting of a variable resistor as indicated at 22 in FIG. 3. The manual color saturation control 22 is the one provided in the usual color television receiver.

In the preceding embodiment, however, the circuit for coupling the high frequency output signal of the color take-off transformer 15 to the band-pass amplifier tube 19 requires a long path. Also, the color saturation controls 17*a* to 17*n* present a considerably large capacitance, which degradates the chrominance signal amplification and frequency characteristics.

Figures 4, 5:
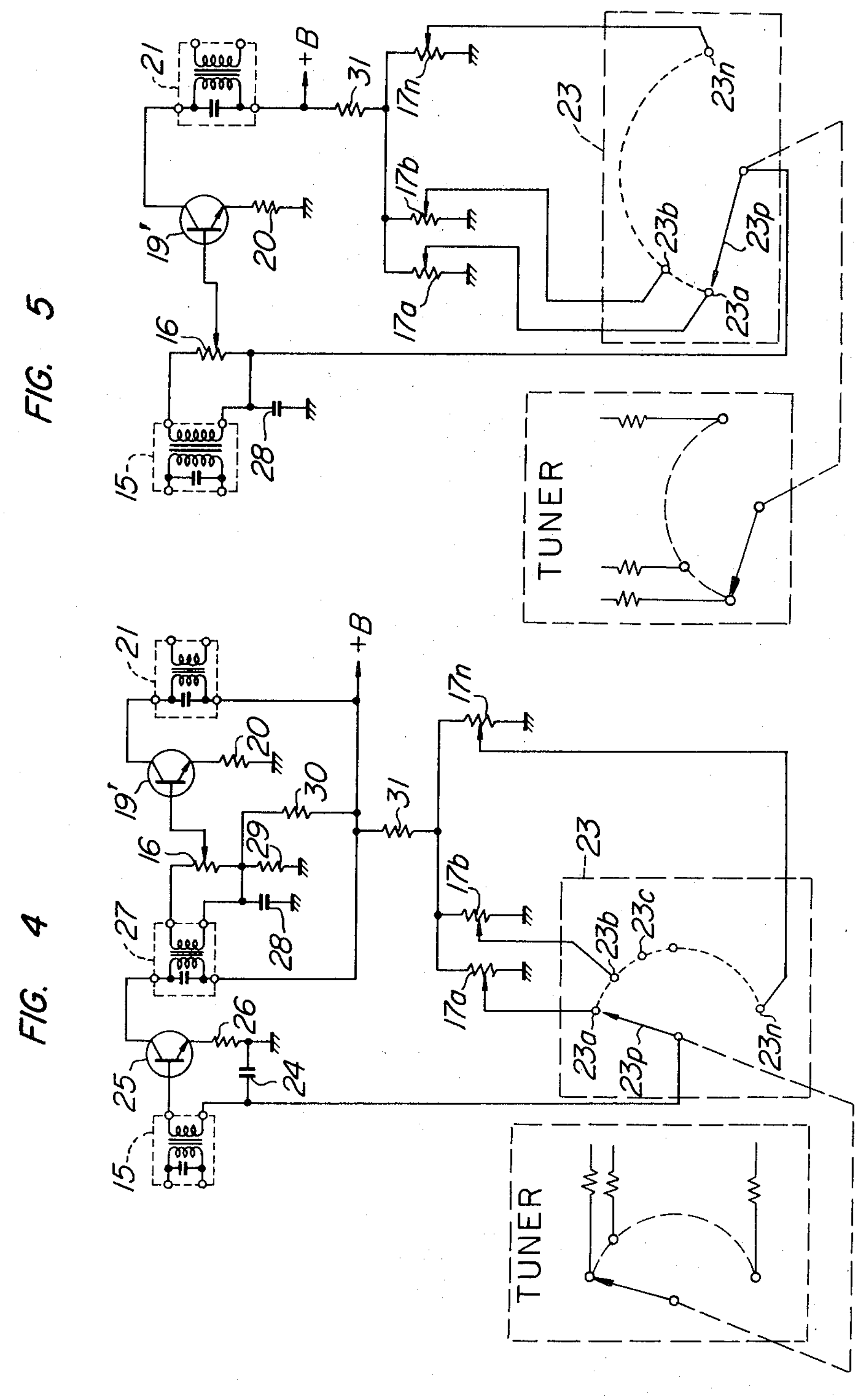
FIGS. 4 to 6 depict circuit diagrams showing other embodiments of the circuit according to the invention.

FIG. 4 shows another embodiment of the invention, in which the color saturation control is achieved by controlling the gain of a transistor. In the figure, numeral 15 designates the color take-off transformer tuned to the color subcarrier (3.58 MHz), numeral 25 a transistor, whose gain is varied with the base bias, numeral 24 a bypass capacitor, numeral 26 an emitter resistor, and numeral 27 a transformer tuned to the 3.58 MHz color subcarrier, which acts both as a collector load of the transistor and an input transformer coupled to another transistor 19'. The transistor 19' provides the function of the band-pass amplifier tube in the previous embodiment. Numeral 16 designates a manual color saturation control, numeral 20 an emitter resistor, numeral 21 the band-pass transformer tuned to the 3.58 MHz color subcarrier, numerals 29 and 30 respective resistors serving to provide a bias voltage to the base of the transistor 19' and numeral 31 a resistor serving to prevent voltage +B from going into the base of the transistor 25. The switch 23 here is the same as that in the previous embodiment of FIG. 3.

The procedure of preadjusting the color saturation controls 17*a* to 17*n* in this embodiment is also the same as in the previous embodiment. When channel *a* is tuned in, the switch pole 23*p* of the switch is thrown to the contact 23*a* connected to the slide tap of the variable resistor 17*a* constituting the color saturation control for channel *a*. The color saturation control 17*a* is then adjusted to provide a desired color saturation in the reproduced picture. Variation of the variable resistance 17*a* varies the base bias on the transistor 25 to vary its collector output. The desired color saturation results as the base bias on the transistor 25 is appropriately preset.

Switching the tuner to the next channel *b* switches the switch pole 23*p* over to the next contact 23*b* connected to the slide tap of the variable resistor 17*b*, which is then adjusted to appropriately preset the base bias on the transistor 25 such that the color saturation for this channel equals that for the previous reference channel *a*.

The same procedure is repeated for the remaining channels *c* to *n*. Once the color saturation controls 17*a* to 17*n* are pre-adjusted for the same desired color saturation, the difference of the afore-mentioned signal relation will not give rise to different color saturation levels as described earlier. The manual color saturation control 16 is for the uniform re-adjustment of the color saturation for all the channels.

In the preceding embodiment, the gain control amplification stage is incorporated in the conventional chrominance band-pass amplifier.

FIG. 5 shows a further embodiment, in which the intermediate amplification stage is dispensed with. In this embodiment, the base bias on the transistor 19' is varied. With this embodiment, however, the circuit design is somewhat difficult if the color killer voltage and the blanking pulse for burst separation are impressed on the base or emitter of the transistor 19'. The gain of the transistor 19' may be varied by varying the emitter bias or collector voltage (+B) as well as the base bias.

Figure 6:
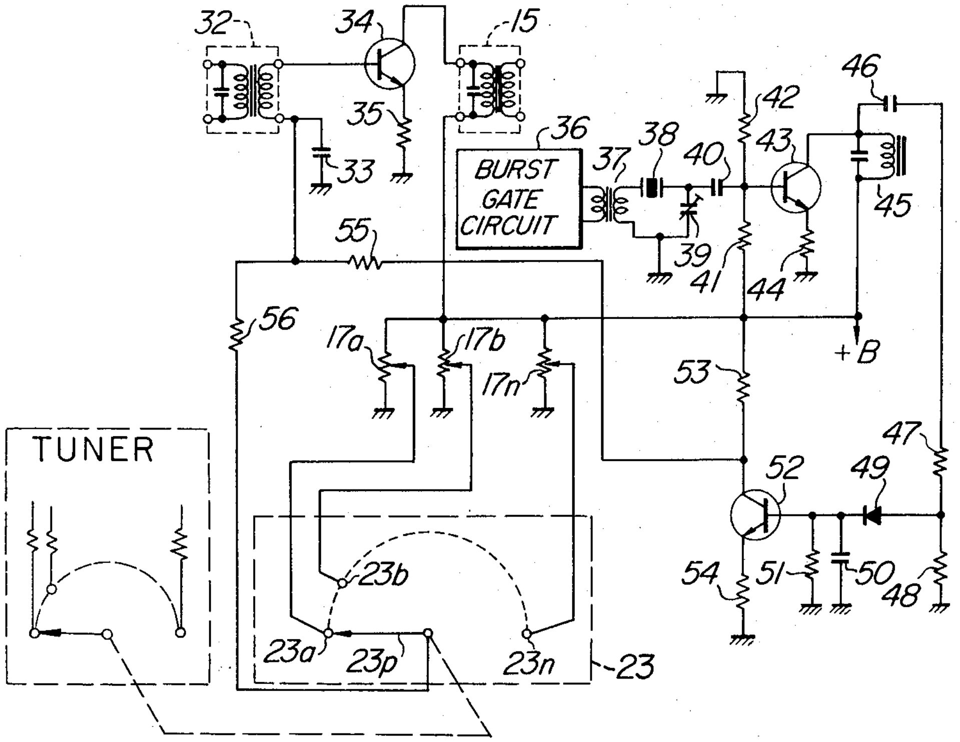
Figure 7:
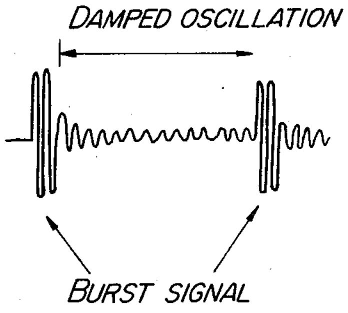
FIG. 7 shows a waveform involved in the operation of the embodiment of FIG. 6.

FIG. 6 shows a still further embodiment, in which the color saturation control is provided by an appropriate external bias added to an ACC circuit (automatic color control circuit) provided in the usual color television set. In the figure, numeral 32 designates an input transformer of the first chrominance band-pass amplifier stage, numeral 34 a band-pass amplifier transistor of the first chrominance band-pass amplifier stage, numeral 33 a bypass capacitor, numeral 35 an emitter resistor for the transistor 34, and numeral 15 an input transformer of the second chrominance band-pass amplifier stage and constituting the load of the transistor 34. Both the transformers 32 and 15 are tuned to the color subcarrier (3.58 MHz). Numeral 36 designates a burst gate circuit, numeral 37 a transformer coupled to the output of the circuit 36, numeral 38 a crystal oscillator, and numeral 39 a variable capacitor. The capacitance of the variable capacitor 39 is adjusted such that the amplitude of the burst signal appearing across the capacitor 39 is maximum. By setting the resonant frequency of the crystal oscillator 38 to the frequency of the burst signal, damped oscillations are produced between two adjacent burst signals, which continue immediately after the first up to the appearance of the second as shown in FIG. 7. Thus, by appropriately regulating the amplitude of the amplified damping voltage through an amplitude regulator, a signal exactly phased to the color subcarrier on the transmitting side and having a constant amplitude is obtained. The subsequent amplification stage comprises a D.C. blocking capacitor 40, and an amplifying transistor 43 having its base connected to base bias resistors 41 and 42, its emitter connected to an emitter resistor 44 and its collector connected to an output transformer 45; this stage amplifies the terminal voltage across the capacitor 39 (FIG. 7). The output of this stage is fed to the amplitude regulator. For the ACC function, a burst signal, whose amplitude is proportional to the amplitude of the input signal, i.e., the chrominance signal from the first chrominance bandpass amplifier stage, but does not depend on the degree of the chrominance signal modulation, is used. Accordingly, the voltage input to the output transformer 45, which is proportional to the amplitude of the burst signal, is also coupled through a D.C. blocking capacitor 46, a voltage divider consisting of series resistors 47 and 48 to a rectifying diode 49, and is further smoothed through a capacitor 50 and a resistor 51. The resultant D.C. voltage is amplified through a transistor 52 which has its collector connected to a collector resistor 53 and its emitter connected to an emitter resistor 54. With increase in the amplitude of the burst signal the resultant rectified voltage impressed on the base of the transistor 52 is increased to increase the collector current therein, thus decreasing the collector voltage on the transistor 52. With the decrease in the collector voltage on the transistor 52, the amplification degree of the transistor 34, whose base is connected through the secondary winding of the transformer 32 and a resistor 55 to the collector of the transistor 52, is reduced. As a result, the increase of the amplitude of the burst signal is repressed, thus automatically controlling the gain of the transistor 34. The arrangement of the parts 46 to 55 is a typical example of the usual ACC.

In this embodiment of the invention, a fixed voltage is made available for superimposition through a resistor 56 and a selected one of preset variable resistors 17*a* to 17*n*. Like the previous embodiments, the switch 23 is interlocked to the tuner mechanism.

With channel *a* tuned in, switch pole 23*p* of the switch is connected to contact 23*a* connected to the slide terminal of variable resistor 17*a*. The variable resistor 17*a* may then be suitably adjusted to vary the fixed bias component of the bias voltage on the base of the transistor 34 so as to have a desired color saturation, for instance red color saturation, if the red color signal is being transmitted, in the picture reproduced on the color tube. Switching to the next channel *b* causes the switch pole 23*p* to jump to the next contact 23*b* connected to the slide terminal of the variable resistor 17*b*, which is then adjusted such that the red color saturation of the picture appearing on the receiver tube equals that red color saturation for the previous reference channel *a*. The same procedure is repeated for the remaining channels *c* to *n*. Once the color saturation controls 17*a* to 17*n* are preadjusted in the above manner, the same color saturation is reproduced on the receiver tube even with different chrominance signal modulation degrees with respect to the burst signal for different broadcast stations.

The same effects may be obtained by so arranging as to provide different values of emitter bias voltage on or collector supply voltage on the transistor 34 through the variable resistors 17*a* to 17*n*.

The principal concepts described above underlying the invention may also be applied to the hue or phasing control. The phasing of the chrominance signal with respect to the burst signal vary within the broadcast standards with different broadcasting stations. Therefore, when channels are switched one over to another, the hue that corresponds to a specific color is not the same but slightly varies with different channels, which is analogous to the case of color saturation.

Figures 8, 9:
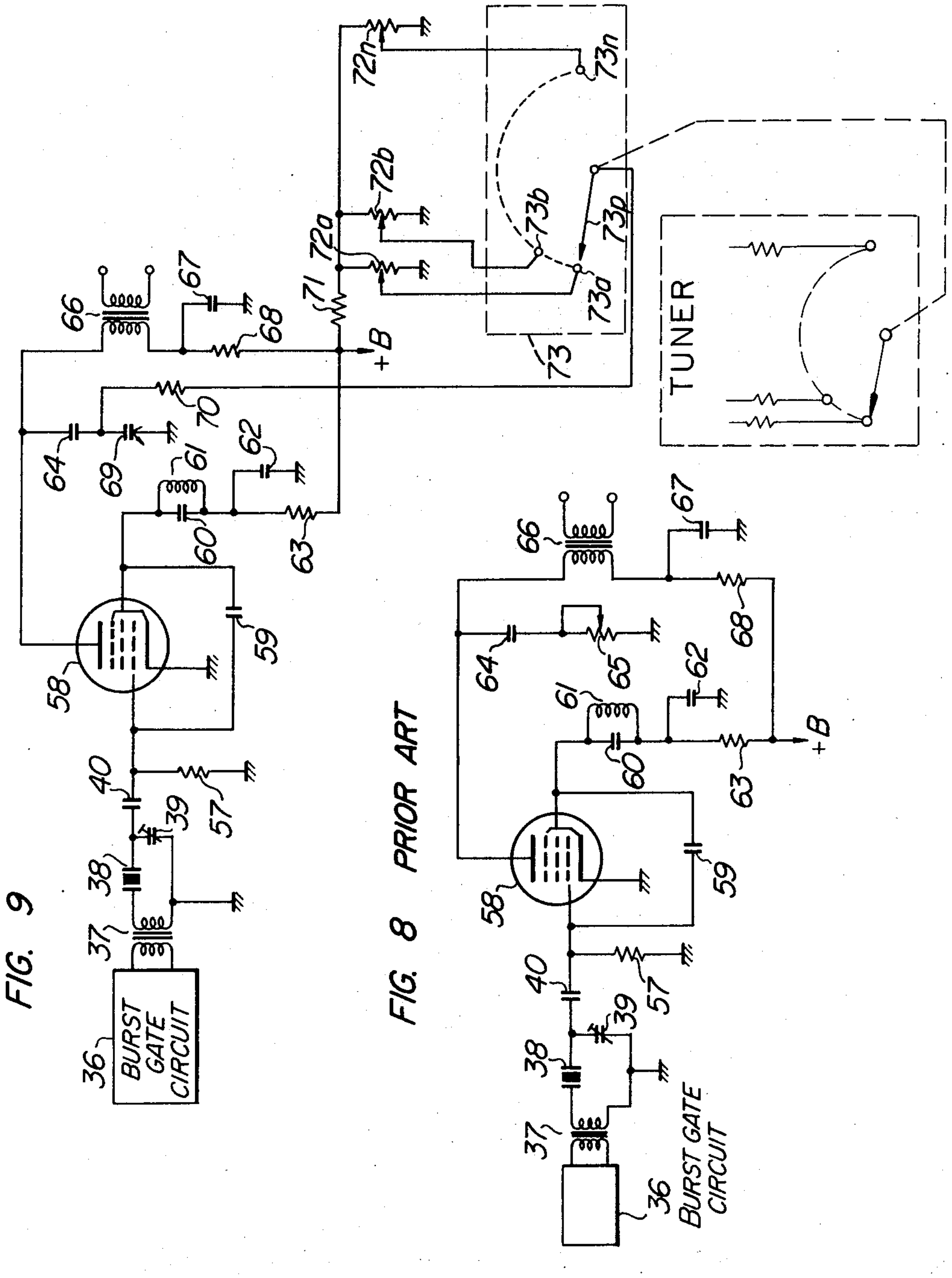
FIG. 9, FIG. 8 PRIOR ART
FIG. 8 depicts a circuit diagram of the color subcarrier oscillator in the conventional color television receiver.
FIGS. 9 to 11 depict circuit diagrams showing further embodiments of the circuit according to the invention.

FIG. 8 shows a typical example of the usual hue control incorporated in the color subcarrier oscillator 14 in FIG. 1, whose oscillation is locked to the burst signal to produce the color subcarrier. In the figure, parts 36 to 40 are the same as the corresponding parts in FIG. 6, so will not be described. The hue control is carried out at an appropriate intermediate point between the input side of the burst gate circuit 36 and the output side of the color subcarrier oscillator (producing continuous 3.58 MHz wave). In the circuit of FIG. 8, the Q of the resonant circuit on the output side of the 3.58 MHz tuned transformer is varied for hue control. The output of the resonant circuit is coupled through the D.C. blocking capacitor 40 onto the control grid of a pentode oscillator 58. Numeral 57 designates a control grid leak resistor and numeral 59 a feed-back capacitor for the feed-back from the screen grid to the control grid of the pentode 58. Numerals 60 and 61 respectively designate a capacitor and an inductor, which constitute a resonant circuit tuned to the color subcarrier frequency. Numeral 63 designates a resistor serving to provide an appropriate screen grid voltage, and numeral 62 a bypass capacitor serving to prevent the A.C. feed-back through the resistor 63 to the screen grid of the tube.

A capacitor 64 serves to tune the transformer 66 to the color subcarrier. Numeral 65 designates a variable resistor in series with the capacitor 64. It serves to vary the Q of the resonant circuit of capacitor 64 and the primary of the transformer 66 so as to vary the phase of the color subcarrier output across the transformer 66 with respect to the burst signal for the hue control. Numeral 67 designates a bypass capacitor, and numeral 68 a resistor serving to provide an appropriate plate voltage to the tube 58. The actual television receiver circuit often includes some other inductors, capacitors and resistors in addition to the component parts in the circuit of FIG. 8. The parts 57 to 68 constitute a self-oscillation circuit always oscillating at a frequency equal or extremely close to the color subcarrier frequency. When it receives the burst signal separated by the burst gate circuit, it is locked to the burst signal and the frequency of self-oscillation becomes equal to the burst signal frequency. This circuit does not adopt the automatic hue control, so that the phase of the burst signal and that of the waveform appearing at the plate of the tube 58 do not coincide with each other and the phase of the plate side waveform is adjusted by the variable resistor 65.

FIG. 9 shows a further embodiment, wherein the same concepts as for the color saturation control described above are introduced to the circuit of FIG. 8. In the figure, numeral 69 designates a variable capacitance diode whose capacitance varies with the D.C. bias across it, numeral 70 a high impedance resistor serving to prevent the resonant circuit of capacitor 64, transformer 66 and variable capacitance 69 from being affected by the distributed capacitance of the switch 73, and numeral 71 a resistor serving to provide an appropriate voltage drop. In this embodiment, presettable variable resistors 72*a* to 72*n* are provided, which have their respective slide taps connected to the corresponding fixed contacts 73*a* to 73*n* of the switch interlocked to the tuner mechanism of the receiver. The impedance of the capacitor 64 is selected to be sufficiently low compared to that of the variable capacitance diode 69, so that the frequency of the resonant circuit of parts 64, 66 and 69 depends upon the capacitance of the variable capacitance diode 69 and the inductance of the transformer 66.

With channel *a* tuned in, the switch pole 73*p* of the switch 73 is connected to the fixed contact 73*a* leading to the slide terminal of the variable resistor 72*a*. The variable resistor 72*a* may then be appropriately adjusted to vary the bias across the variable capacitance diode 69 so as to have a correct hue, for instance correct red hue if the red color signal is being transmitted, in the reproduced picture. Next, after switching to channel *b*, the variable resistor 72*b* may be adjusted such that the red hue of the picture appearing on the receiver tube is the same as the red hue for the previous reference channel *a*. The phase relation between the burst signal and the color subcarrier output across the transformer 66 for this channel does not coincide with that for the previous channel *a*. This is because the phase of the chrominance signal with respect to the burst signal is different with different broadcast stations. The same procedure is repeated for the remaining channels *c* to *n*. Once the hue controls 72*a* to 72*n* are pre-adjusted in the above manner, the manual hue control, which would otherwise be required every time channels are switched, becomes unnecessary, for no hue variation will be encountered when switching to any channel. In addition to the above automatic hue control, a manual hue control may also be inserted, for instance, on the input side of the burst gate circuit so that the hue may be readjusted uniformly for all the channels by manipulating the manual hue control.

Figure 10:
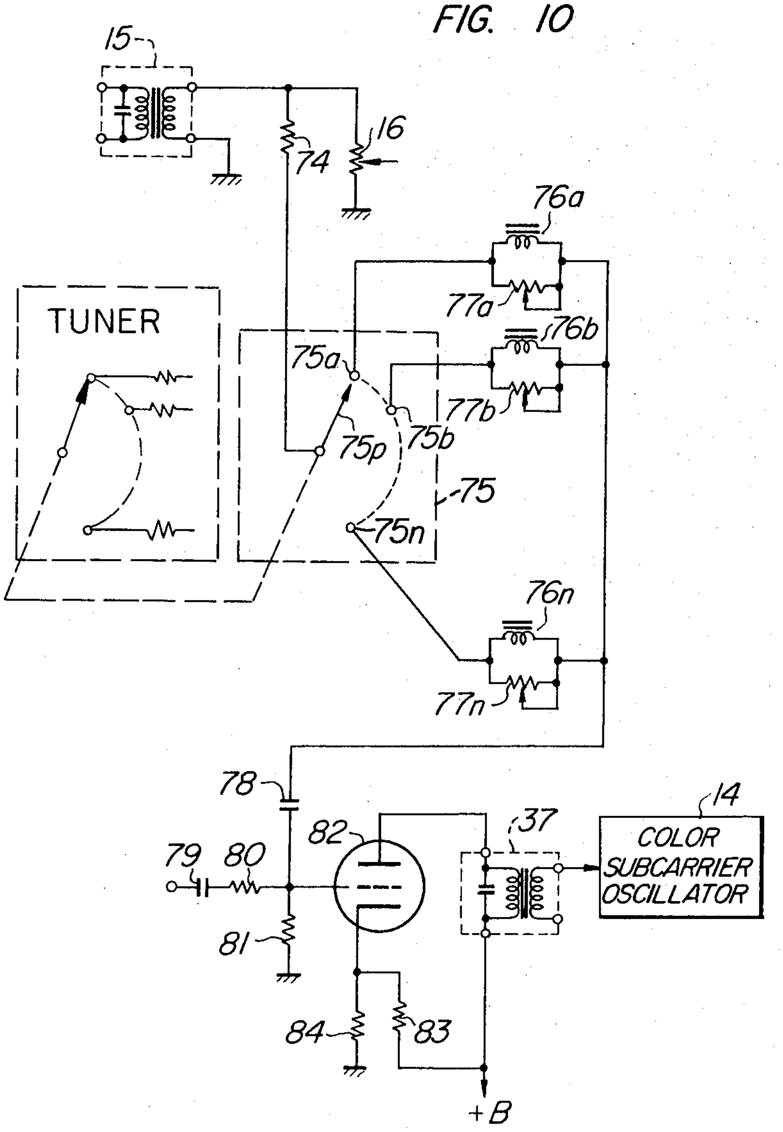

FIG. 10 shows a further embodiment, in which the automatic hue control is provided on the input side of the burst gate circuit. In this embodiment, the conventional automatic hue control is supplemented with a switch 75 and additional controls 76*a* and 77*a*, . . . , 76*n* and 77*n*. A resistor 74, which has a fixed resistance, serves to reduce the effect of varying the resistance of, for instance, the hue control variable resistor 77*a* upon the second chrominance band-pass amplifier stage. The resistor 77*a* is actually a damping resistor in parallel with its associated coil 76*a*. Variation of the resistance of the variable resistor 77*a* varies the phase of the burst signal. A D.C. blocking capacitor 78 is in series with for instance, the coil 76*a* to form a series resonant circuit. It determines the extent of the phase variation. Burst gated pulses are supplied through a D.C. blocking capacitor 79 and an amplitude divider consisting of resistors 80 and 81 to the grid of a burst separator tube 82. Resistors 83 and 84 serve to provide cathode bias to the tube 82 such that only when the gated pulse is applied on the grid of the tube 82 the grid is positively biased with respect to the cathode of the tube 82 to permit the tube current to flow. Numeral 37 designates a burst separator transformer tuned to the burst signal frequency. The *n* variable resistors 77*a* to 77*n* respectively in parallel with the associated inductors 76*a* to 76*n* are connected to the corresponding fixed contacts 75*a* to 75*n* of the switch 75, which is interlocked to the tuner mechanism of the receiver.

With channel *a* tuned in, the extent of phase variation depends upon the resistance of the variable resistor 77*a*. The variable resistor 77*a* may be appropriately adjusted to have a correct hue, for instance a correct red hue if the red color signal is being transmitted from the selected station. Then, by switching to the next channel *b* the switch pole 75*p* of the switch 75 is thrown to the fixed contact 75*b*, which is connected to the circuit of inductor 76*b* and variable resistor 77*b*. This time the variable resistor 77*b* may be adjusted such that the red hue of the reproduced picture on the receiver tube is the same as the red hue for the previous reference channel *a*. The same procedure may be repeated for the remaining channels *c* to *n*. Once the variable resistors 77*a* to 77*n* are pre-adjusted, no hue variation will be encountered when switching to any channel similar to the preceding embodiment of FIG. 9. If the D.C. blocking capacitor 78 is replaced with a variable capacitance diode, only one couple of inductor and variable resistor, for instance inductor 76*a* and variable resistor 77*a*, is required. In this case, the bias voltage to be applied across the substituted variable capacitance diode may of course be provided in the same manner as in the previous embodiment of FIG. 9.

In the foregoing description, the color saturation control and hue control have been separately treated. It is of course possible to provide a color television receiver capable of precompensating for variations in both color saturation and hue among the individual broadcast stations by arranging such that the tuner mechanism is ganged to two separate switches, one for the color saturation control and the other for the hue control.

Figure 11:
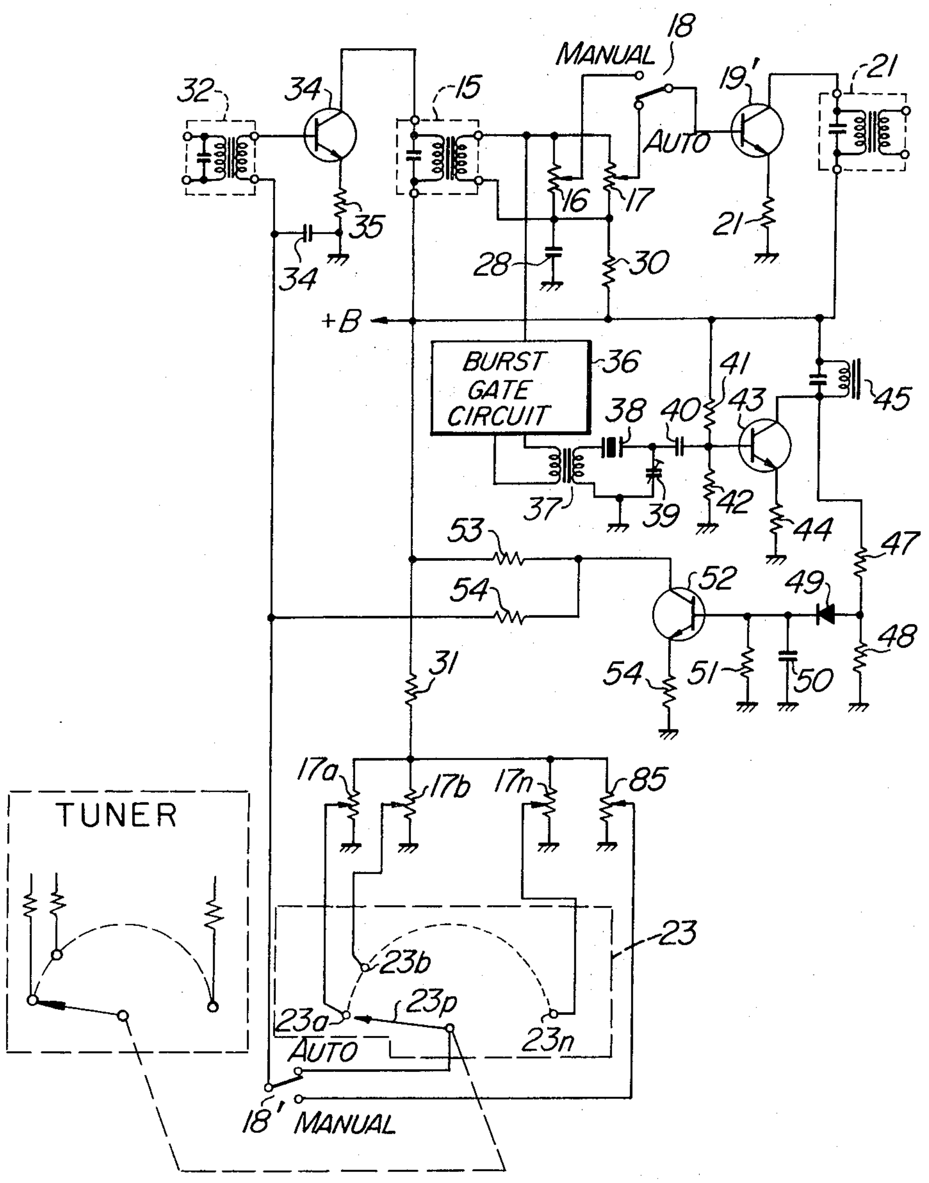

FIG. 11 shows a further embodiment, which includes both automatic saturation control and manual saturation control. In this embodiment, an auto-manual change-over switch having two ganged switch poles 18 and 18' to switch between automatic saturation control and manual saturation control is added to the circuit of FIG. 4. When the changeover switch poles 18 and 18' are thrown to the "AUTO" side, the difference of the relation of the chrominance signal to the burst signal among the broadcast stations will give rise to no difference of the color saturation on the side of the receiver tube, as described earlier. At this time, the color saturation may be re-adjusted uniformly for all the stations appropriately by adjusting the variable resistor 17. When the switch poles 18 and 18' are thrown to the "MANUAL" side, the manual saturation control may be re-adjusted for fine tuning control to obtain a desired color saturation.

The above embodiment is particularly advantageous for the authorized Japanese television channel practice or where several VHF and a couple of UHF channels or several wire broadcasting and a couple of radio broadcasting stations are available for reception. In such circumstances, the number of the presettable variable resistors 17*a* to 17*n* may be reduced by so arranging that when an UHF channel is selected the switch poles 18 and 18' are switched to the "MANUAL" side in cooperation with the tuner mechanism. In this case, the saturation control for the VHF channels is automatically effected while that for the UHF channels may be manually effected. The foregoing also applies to the hue control.

What is claimed is:

1. A color television receiver having channel selecting means for selecting one of a plurality of composite video signals received by said receiver, a demodulation section controlled by said channel selecting means for demodulating the selected video signal, and a chrominance section responsive to the chrominance signal portion of the selected video signal, said chrominance section comprising:

changeover switch means interlocked with said channel selecting means;

color saturation regulating circuit means for regulating the color saturation of the chrominance signal output of said chrominance section; and a plurality of presettable regulating members selectively connected to said regulating circuit means by said changeover switch means, wherein the color saturation of the output of said chrominance section is substantially the same for each of said plurality of video signals.

2. A color television receiver according to claim 1, wherein each of said regulating members comprises a variable resistor which is selectively connected by said changeover switch means to said saturation regulating circuit means.

3. A color television receiver according to claim 1, wherein said color saturation regulating circuit means includes a transistor amplifier and a bias circuit for biasing said transistor, and said regulating members are selectively connected by said switch means to said bias circuit to vary the bias voltage output of said bias circuit to thereby control the gain of said transistor.

4. A color television receiver according to claim 3, wherein said color saturation regulating circuit includes first and second chrominance band-pass amplifier stages, and wherein said second stages includes said transistor amplifier.

5. A color television receiver according to claim 1, wherein said chrominance section further comprises burst signal gate circuit means for gating a burst signal portion of the composite signal with said chrominance section, and automatic color control circuit means for feeding a voltage produced in accordance with the amplitude of the burst signal from said burst signal gate circuit means as an automatic color control voltage back to said color saturation regulating circuit means to impose said automatic color control voltage upon a voltage obtained from a selected one of said regulating members to thereby effect an automatic color control.

6. A color television receiver having channel selecting means for selecting one of a plurality of composite video signals received by said receiver, a demodulation section controlled by said channel selecting means for demodulating the selected video signal, and a chrominance section responsive to the chrominance signal portion of the selected video signal, said chrominance section comprising:

changeover switch means interlocked with said channel selecting means;

hue regulating circuit means for regulating the hue of the chrominance signal output of said chrominance section; and a plurality of presettable regulating members selectively connected to said regulating circuit means by said changeover switch means, wherein the hue of the output of said chrominance section is substantially the same for each of said plurality of video signals.

7. A color television receiver according to claim 6, wherein said hue regulating circuit means includes a diode having a capacitance which varies in accordance with a bias voltage applied thereto, and said regulating members are selectively connected by said switch means to said diode to apply a voltage obtained from a selected one of said regulating members to said diode as said bias voltage.

8. A color television receiver according to claim 6, wherein said regulating members each comprises an inductor and a variable resistor connected together as a parallel circuit which is selectively connected by said switch means to said hue regulating circuit means.

* * * * *

PO-1050
(5/69)

UNITED STATES PATENT OFFICE
CERTIFICATE OF CORRECTION

Patent No. 3,692,929 Dated September 19, 1972

Inventor(s) Masayoshi Hirashima

It is certified that error appears in the above-identified patent and that said Letters Patent are hereby corrected as shown below:

ON THE TITLE PAGE:

The name of the Assignee should read "Matsushita Electric Industrial Co., Ltd."

Signed and sealed this 15th day of May 1973.

(SEAL)
Attest:

EDWARD M.FLETCHER,JR.
Attesting Officer

ROBERT GOTTSCHALK
Commissioner of Patents